United States Patent [19]
Onishi et al.

[11] Patent Number: 5,337,401
[45] Date of Patent: Aug. 9, 1994

[54] OPTICAL FUNCTIONING GLASS AND METHOD OF MANUFACTURING SAME, OPTICAL FIBER, WAVEGUIDE DEVICE, AND LASER DEVICE

[75] Inventors: Masashi Onishi; Koji Nakazato; Yoshiki Chigusa; Minoru Watanabe, all of Yokohama; Yoshiaki Miyajima, Mito, all of Japan

[73] Assignees: Sumitomo Electric Industries, Ltd., Osaka; Nippon Telegraph and Telephone Corporation, Tokyo, both of Japan

[21] Appl. No.: 779,495

[22] Filed: Oct. 24, 1991

[30] Foreign Application Priority Data

Oct. 24, 1990 [JP] Japan .................... 2-286452

[51] Int. Cl.$^5$ .......................... G02B 6/00; H01S 3/30; C03C 25/02; C03C 13/04
[52] U.S. Cl. ..................... 385/142; 385/123; 385/42; 385/141; 385/144; 372/6; 372/92; 65/399; 65/386; 359/333; 359/341; 359/343; 359/346; 501/11; 501/37; 252/582
[58] Field of Search ............... 385/123, 129, 130, 144, 385/141, 142, 122, 42, 43; 252/582, 584, 301.6 F, 301.6 S, 301.4 F, 301.4 R; 372/6, 7, 40, 21, 92; 65/3.11, 134, 136; 501/11, 31, 35, 37, 41, 94, 95, 53, 64; 359/333, 341, 342, 343, 344, 345, 346

[56] References Cited

U.S. PATENT DOCUMENTS

| | | | |
|---|---|---|---|
| 3,422,025 | 1/1969 | Snitzer et al. | 372/40 X |
| 3,830,749 | 8/1974 | Deeg et al. | 372/40 X |
| 3,869,405 | 3/1975 | Shaw et al. | 252/301.6 S |
| 4,142,986 | 3/1979 | Rapp | 372/40 |
| 4,371,965 | 2/1983 | Lempicki et al. | 372/40 |
| 4,764,933 | 8/1988 | Kozlovsky et al. | 372/40 |
| 4,782,491 | 11/1988 | Snitzer | 372/6 |
| 4,788,687 | 11/1988 | Miniscalco et al. | 385/142 |
| 5,244,846 | 9/1993 | Onishi et al. | 385/142 X |
| 5,245,690 | 9/1993 | Aida et al. | 385/142 |
| 5,253,322 | 10/1993 | Onishi et al. | 385/142 |
| 5,274,728 | 12/1993 | Tran | 385/142 |
| 5,274,734 | 12/1993 | Jin et al. | 385/142 |

OTHER PUBLICATIONS

Hirayama, "Nd$^{3+}$ fluorescence in alkali borate glasses" Physics and Chemistry of Glasses, vol. 7, No. 2, Apr. 1966 pp. 52–55.
Chen et al., "Nd-glass thin-film waveguide . . . " Appl. Phys. Lett. vol. 28, No. 8 Apr. 1976 pp. 435–437.
Yamanishita, "Multimode optical fiber for laser applications", Chemical Abstracts, vol. 108, No. 24, Jun. 1988, Columbus, Ohio, US, Abstract No. 209011X, p. 283.
Grubb, S. G., "Diode-pumped 1.36 μm Nd-Doped Fibre Laser", Electronics Letters, Jan. 18, 1990, vol. 26, No. 2, pp. 121–122.

*Primary Examiner*—Brian Healy
*Attorney, Agent, or Firm*—Cushman, Darby & Cushman

[57] ABSTRACT

An optically active device comprising an optical fiber, a light source and a coupler is disclosed. The optical fiber has a core made of a silicate glass containing Rb and/or Cs oxide. The core is doped with Nd$^{3+}$ as an active ion and transmits light at 1.3 μm band. The light source generates excitation light at 0.8 μm. The coupler directs the excitation light from the light source into the core of the optical fiber. A signal light or a spontaneous light at 1.3 μm band which is transmitted in the core stimulates Nd$^{3+}$ to emit light at 1.3 μm band. As a result an optical function such as optical amplification can be effected at 1.3 μm band.

22 Claims, 6 Drawing Sheets

OPTICAL FUNCTIONING GLASS AND METHOD OF MANUFACTURING SAME, OPTICAL FIBER, WAVEGUIDE DEVICE, AND LASER DEVICE

BACKGROUND OF THE INVENTION

1. field of the Invention

The present invention relates to an optical functioning glass doped with $Nd^{3+}$, and to an optical fiber, a waveguide device, and an optically active device, all of which use this optical functioning glass.

2. Related Background Art

Efforts have been made to manufacture an optically active device such as a fiber amplifier, a fiber sensor, and a fiber laser by using a glass doped with a rare-earth element for the application to a light communication at a 1.3-$\mu$m wavelength band and the like. For example, a report has been made (ELECTRONICS LETTERS, 1990, Vol. 26, No. 2, pp. 121-122) in which an optical functioning glass is prepared by adding neodymium ions ($Nd^{3+}$) as an active ions to a phosphate glass as a host glass, an optical fiber is formed from this optical functioning glass, and laser oscillation characteristics of the optical fiber are evaluated. It reports about the optical fiber characteristic that a fluorescence peak wavelength caused by $Nd^{3+}$ was about 1.32 $\mu$m, an absorption peak wavelength caused by ESA (excited state absorption) transition was about 1.31 $\mu$m, and an oscillation peak wavelength was about 1.36 $\mu$m.

However, in the reported optical fiber, a sufficiently high laser oscillation gain cannot be obtained because the absorption peak at the wavelength of 1.31 $\mu$m is present near the fluorescence peak at the wavelength of 1.32 $\mu$m, and because the intensity of the absorption peak at the 1.31-$\mu$m wavelength band is higher than that of the fluorescence peak at the 1.32-$\mu$m wavelength band.

In addition, since the absorption peak exists at a wavelength shorter than that of the fluorescence peak, the oscillation peak wavelength is shifted to a wavelength longer than the 1.3-$\mu$m wavelength band. As a result, a substantial gain of laser oscillation cannot be obtained at the 1.3-$\mu$m wavelength band.

SUMMARY OF THE INVENTION

It is an object of the present invention, in consideration of the above situation, to provide an optical functioning glass capable of performing optical amplification and optical oscillation of light at a 1.3-$\mu$m wavelength band or other wavelength bands, or improving optical amplification efficiency and optical oscillation efficiency. It is another object of the present invention to provide an optical fiber and a waveguide device, both of which use the optical functioning glass. It is still another object of the present invention to provide an optically active device such as an optical amplifier or a laser, which uses the optical fiber or the waveguide device.

The present invention is to provide an oxide-based optical functioning glass comprising a host glass doped with $Nd^{3+}$ as an active ion, the host glass containing rubidium (Rb) and/or cesium (Cs) as its constituting component.

According to this optical functioning glass, since the host glass consists of an oxide-based multi-component glass containing Rb and/or Cs, the wavelength position of the absorption peak can be largely shifted relative to the wavelength position of the fluorescence peak. As a result, it is found that a glass suitable for optical amplification and optical oscillation at the 1.3-$\mu$m wavelength band or other wavelength bands can be obtained, as will be described later.

In a preferred embodiment of an optical functioning glass according to the present invention, an oxide-based multi-component glass containing an alkaline-earth element together with Rb and/or Cs is used as the host glass.

By using the host glass containing an oxide of an alkaline-earth element, chemical stability such as the weather resistance of the optical functioning glass can be improved.

In addition, the present invention is to provide an optical fiber having a core made of the above optical functioning glass.

According to this optical fiber, a glass obtained by doping $Nd^{3+}$ in a host glass containing Rb and/or Cs is used as a core glass. For this reason, optical amplification and optical oscillation of light propagating in the core glass can be performed at the 1.3-$\mu$m wavelength band and other wavelength bands, and the optical amplification gain and the optical oscillation gain can be increased. That is, light is effectively confined in the core by fiber formation, and the loss of the confined light is extremely low, thereby forming an inverted population of $Nd^{3+}$ with a low threshold value.

In addition, the present invention is to provide a waveguide device having a planar waveguide made of the above optical functioning glass.

Furthermore, the present invention is to provide an optically active device comprising the above optical fiber or the waveguide device, a light source for generating light for exciting $Nd^{3+}$, and optical means for directing the excitation light from the light source to the optical fiber or the waveguide device.

According to the above optically active device, $Nd^{3+}$ are excited by the excitation light directed to the optical fiber or the waveguide device. Most of the $Nd^{3+}$ are stimulated by light of the 1.3-$\mu$m wavelength band or other wavelength bands incident together with the excitation light on the optical fiber or the waveguide device, thereby generating radiation light. Thus, Optical functions such as optical amplification, laser oscillation, and optical switching can be performed at this wavelength band.

In addition, the present invention is to provide a fiber amplifier comprising the optical fiber for propagating signal light at a 1.3-$\mu$m wavelength band or a band near the 1.3-$\mu$m wavelength band, a light source for generating excitation light at an 0.8-$\mu$m wavelength band or a band near the 0.8-$\mu$m wavelength band, optical means for directing the excitation light from the light source to an optical fiber, and means for coupling the signal light at the 1.3-$\mu$m wavelength band or the band near the 1.3-$\mu$m wavelength band into the optical fiber.

According to this fiber amplifier, $Nd^{3+}$ is excited by the excitation light at an 0.8-$\mu$m wavelength band or the band near the 0.8-$\mu$m wavelength band directed into the optical fiber. Most of the $Nd^{3+}$ are stimulated by the signal light of the 1.3-$\mu$m wavelength band or the band near the 1.3-$\mu$m wavelength band incident together with the excitation light, thereby generating radiation light. Therefore, optical amplification at the 1.3-$\mu$m wavelength band or the band near the 1.3-$\mu$m wavelength band can be performed.

In addition, the present invention is to provide a fiber laser comprising the optical fiber for propagating signal light at a 1.3-$\mu$m wavelength band or a band near 1.3-$\mu$m wavelength band, a light source for generating excitation light at an 0.8-$\mu$m wavelength band or a band near the 0.8-$\mu$m wavelength band, optical means for directing the excitation light from the light source to an optical fiber, and resonator means for feeding the light at the 1.3-$\mu$m wavelength band or the band near the 1.3-$\mu$m wavelength band back to the optical fiber.

According to this fiber laser, $Nd^{3+}$ is excited by the excitation light at the 0.8-$\mu$m wavelength band or the band near the 0.8-$\mu$m wavelength band. Some or most of the excited $Nd^{3+}$ are stimulated by the light of the 1.3-$\mu$m wavelength band or the band near the 1.3-$\mu$m wavelength band present in the optical fiber, thereby generating the radiation light. Optical oscillation at the 1.3-$\mu$m wavelength band or the band near the 1.3-$\mu$m wavelength band can be performed.

In addition, the present invention is to provide a waveguide amplifier and a waveguide laser, wherein the optical fibers constituting the fiber amplifier and the fiber laser are replaced with the above waveguide devices, respectively.

In addition, the present invention is to provide a method of manufacturing an oxide-based optical functioning glass obtained by doping $Nd^{3+}$ as an active ion in a host glass, wherein the host glass is prepared by melting a material mixed with Rb oxide and/or Cs oxide.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The principle of the present invention and the process in which the present invention was established will be described below. The present inventor proposed the following assumption and made extensive studies on it. That is, in order to change the wavelength position of an emission peak of an $Nd^{3+}$ relative to its absorption peak, it is assumed that effects of a crystalline electric field, Coulomb interaction, and spin-orbit interaction upon electrons in $Nd^{3+}$ should be changed.

For example, a 4f-orbit electron assumed to be related to light absorption or emission at the 1.3-$\mu$m wavelength band is taken into consideration. The crystalline electric field is assumed to have almost no effect on the 4f-orbit electrons because the field is shielded by electrons of the outer shell. On the other hand, it is assumed that the Coulomb interaction and the spin-orbit interaction can be changed by changing the distance between electrons within the 4f orbit or the distance between the atomic nucleus and electrons. By expanding or constricting an $Nd^{3+}$ electron cloud, the absorption and emission wavelengths at the 1.3-$\mu$m wavelength band are assumed to be shifted.

More specifically, it is considered to be preferable to change the bond property between $Nd^{3+}$ and atoms located therearound in order to expand or constrict the electron cloud. That is, an oxide of Rb or Cs as a long-period element is used as a component of a host glass, and its concentration is changed to increase or decrease the strength of a covalent bond or an ionic bond between $Nd^{3+}$ and the ligands located therearound. As a result, the $Nd^{3+}$ electron cloud can be expanded or constricted. In addition, the absorption and emission at and near the 1.3-$\mu$m wavelength band are assumed to be shifted. In this case, an alkali element having a high ionicity, such as Rb or Cs, is assumed to strongly act on $Nd^{3+}$. When the concentrations of oxides of these elements are increased or decreased in the host glass, the wavelength shifts of the absorption and emission peaks are nonuniformed. Moreover, the relative wavelength positions of the absorption and emission peaks are expected to be largely changed.

The absorption and emission wavelength shifts at the 1.3-$\mu$m wavelength band have been described above. A similar assumption can be made for the absorption and emission wavelengths in other wavelength bands.

The above conclusion is simply an assumption. The present inventor confirmed improvements of optical amplification and optical oscillation characteristics of an $Nd^{3+}$-doped glass on the basis of experiments (to be described later) and extensive studies based on phenomena derived from the experimental results.

Figure 1:
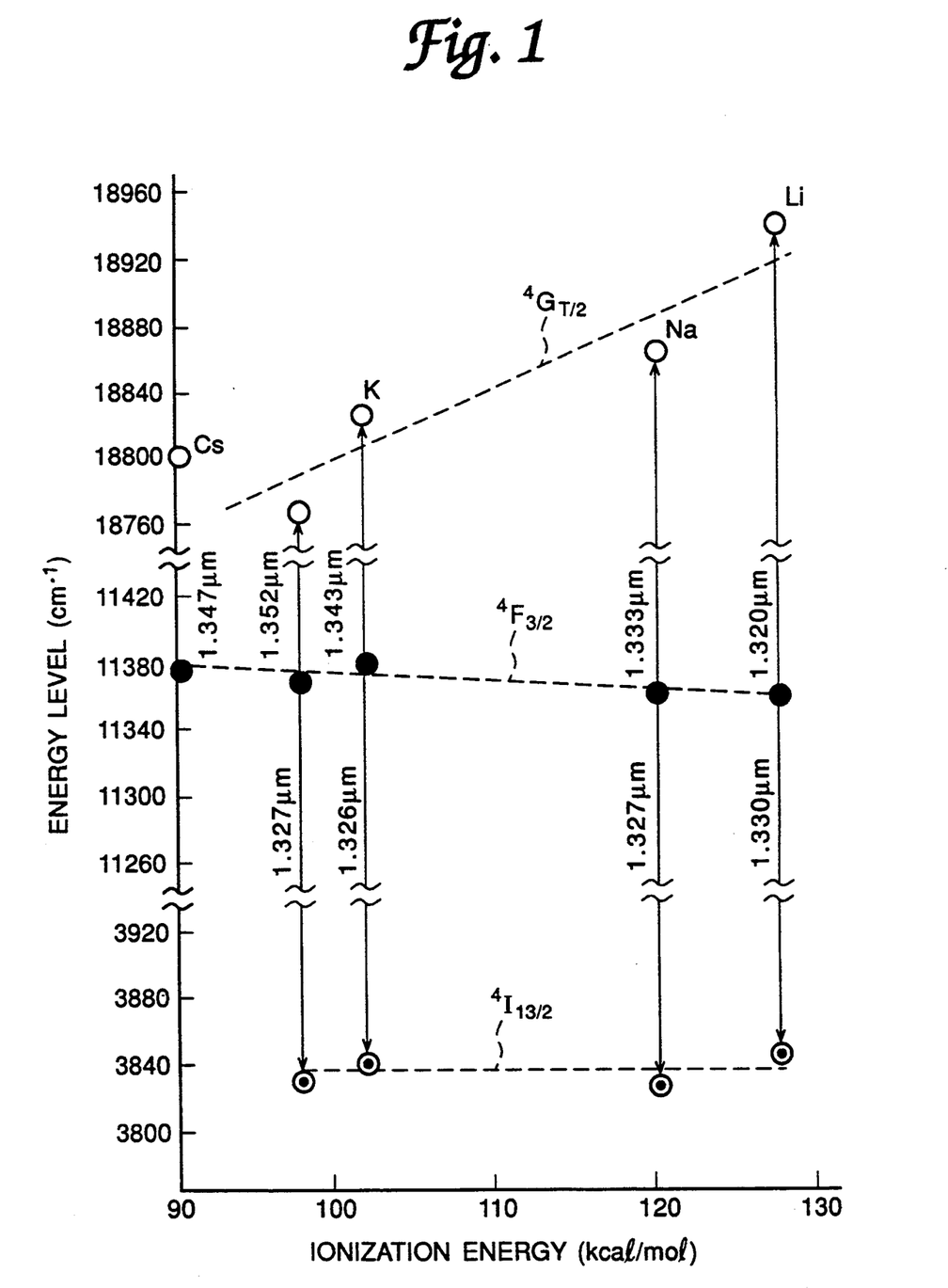
FIG. 1 is a graph showing a relationship between the types of alkali dopants and $Nd^{3+}$ energy levels in a silicate glass.

FIG. 1 shows changes in $Nd^{3+}$ energy levels obtained by changing the types of alkali element oxides $R'_2O$ added to a silicate glass ($20Na_2O$-$15R'_2O$-$65SiO_2$).

A brief description will be made for a light absorption/emission mechanism of $Nd^{3+}$ at the 1.3-$\mu$m wavelength band prior to a description of the drawings. An electron set in a ground state level $^4I_{9/2}$ is temporarily excited to a level $^4F_{5/2}$ by excitation light of about 0.8 $\mu$m so that a non-radiation process is set such that phonons or the like are emitted. The energy level of the electron is then shifted to a level $^4F_{3/2}$. By this pumping, when an inverted population is formed between the level $^4F_{3/2}$ and the level $^4I_{13/2}$, emission having a peak at the 1.32-$\mu$m wavelength band can be performed. On the other hand, an electron set in the level $^4F_{3/2}$ absorbs light of the 1.31-$\mu$m wavelength band and may be excited to a level $^4G_{7/2}$. For this reason, in conventional glasses, even if an electron is pumped to the level $^4F_{3/2}$, efficient emission cannot be performed at the 1.32-$\mu$m wavelength band. For this reason, a sufficiently high laser gain cannot be obtained at and near the 1.31-μm wavelength band.

The illustrated energy levels, that is the wavenumbers of electrons are calculated from absorption peak wavelengths at and near 530 nm, 800 nm, and 880 nm by using a spectrophotometer. These peaks correspond to the energy levels $^4G_{7/2}$, $^4F_{3/2}$, and $^4I_{13/2}$, respectively.

As is apparent from FIG. 1, the energy levels $^4G_{7/2}$, $^4F_{3/2}$, and $^4I_{13/2}$ linearly change in accordance with the ionic energies of alkali elements R' used. In this case, although the interval between the energy levels $^4F_{3/2}$ and $^4I_{13/2}$ is not almost changed, the interval between the energy levels $^4G_{7/2}$ and $^4F_{3/2}$ greatly varies. This phenomenon indicates that the energy difference between the levels $^4G_{7/2}$ and $^4F_{3/2}$ corresponding to the ESA at the 1.32-μm wavelength band greatly varies while the energy difference between the levels $^4F_{3/2}$ and $^4I_{13/2}$ corresponding to the fluoresce at the 1.32-μm wavelength band is not almost changed. In particular, when a long-periodic element such as Rb and Cs is used as an alkali element, an ESA peak wavelength is increased to 1.345 μm or more, while the wavelength of the fluorescence peak is limited to about 1.325 μm. Since the ESA wavelength does not interact with the fluorescent wavelength if their difference is 20 nm or more, the phenomenon which causes the ESA to influence the fluorescence (i.e., excited electrons set in the energy level $^4F_{3/2}$ are deenergized by the ESA) can be suppressed by use of an alkali element, Rb or Cs. In addition, when an oxide of an alkali element, Rb or Cs, is used as a dopant to shift the ESA peak to the long-wavelength side of the fluorescence peak, the wavelength band for obtaining the optical amplification and oscillation gains can be relatively shifted to the shorter-wavelength side. As a result, the optical amplification and oscillation gains can be obtained near a wavelength of 1.31 μm shorter than the wavelength of 1.32 μm at which the fluorescence peak is present.

Figure 2:
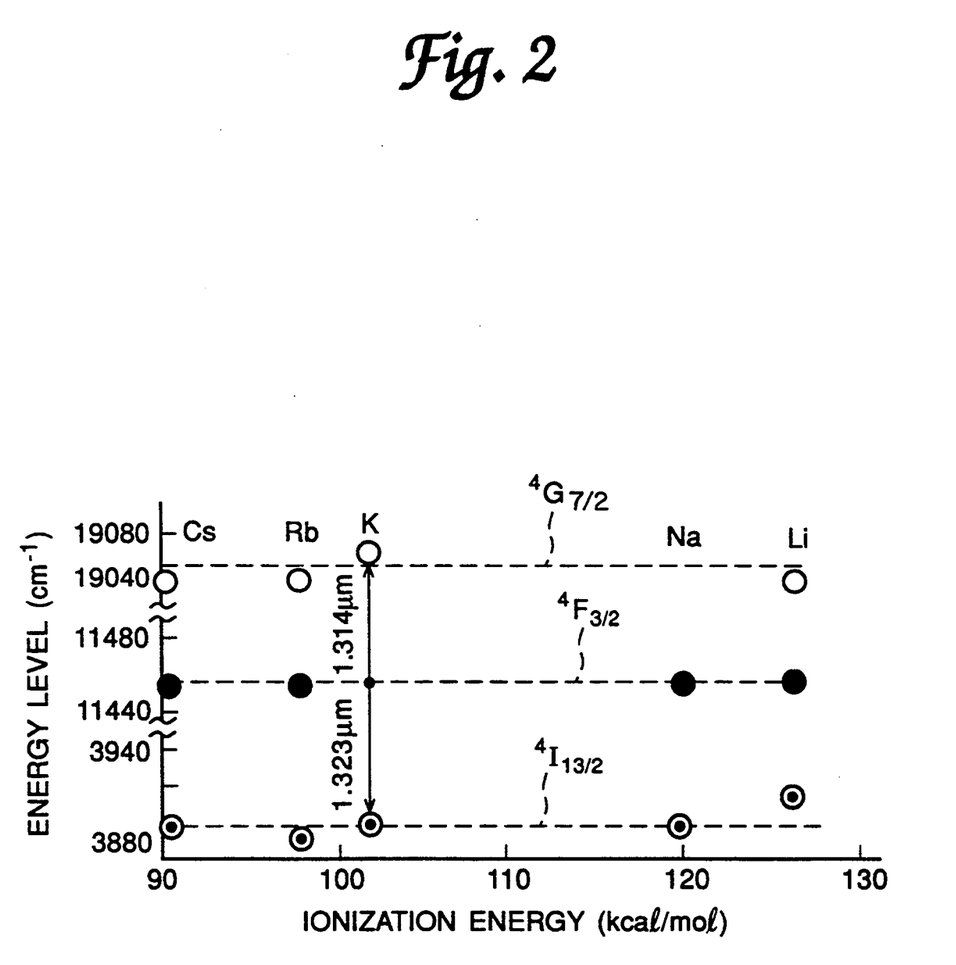
FIG. 2 is a graph showing a relationship between the types of alkali dopants and $Nd^{3+}$ energy levels in a phosphate glass.

FIG. 2 shows changes in $Nd^{3+}$ energy levels obtained by changing the types of alkali element oxides $R'_2O$ added to a phosphate glass ($10La_2O_3$-$25R'_2O$-$65P_2O_5$).

In the graph of FIG. 2, the energy levels $^4G_{7/2}$, $^4F_{3/2}$, and $^4I_{13/2}$ respectively corresponding to the absorption peaks at the wavelengths of 530 nm, 800 nm, and 880 nm are kept constant regardless of the types of alkali elements R' used. In the case of the phosphate glass, it is difficult to change the relationship between the three energy levels associated with optical amplification at the 1.3-μm wavelength band. However, some improvement can be found when a phosphate is partially replaced with a silicate.

Figure 3:
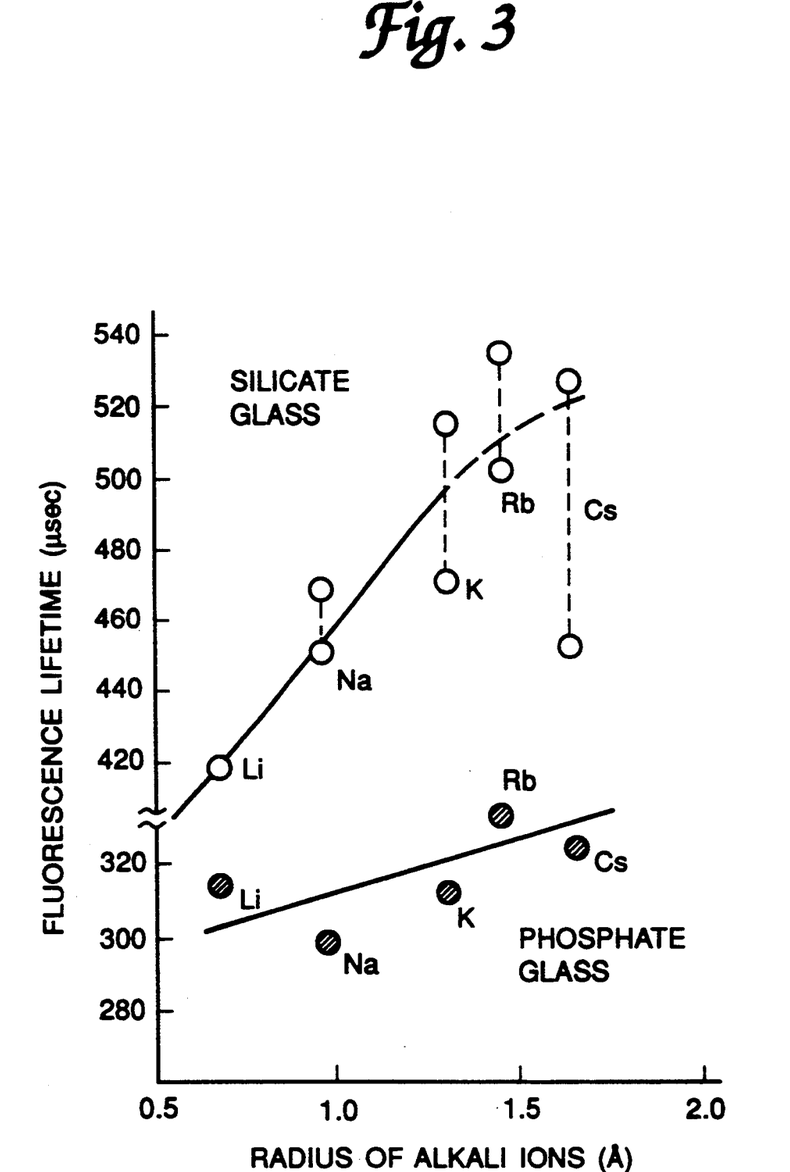
FIG. 3 is a graph showing a relationship between the types of alkali dopants and $Nd^{3+}$ fluorescence lifetimes.

FIG. 3 shows changes in fluorescence lifetimes for the $Nd^{3+}$ energy levels $^4F_{3/2}$ and $^4I_{13/2}$ obtained by changing the types of alkali elements R' added to the multi-component glasses in FIGS. 1 and 2. As is apparent from FIG. 3, in both silicate and phosphate glasses, when an alkali element having an ion of a large radius is used, the $Nd^{3+}$ fluorescence lifetime can be prolonged. In this sense, a glass containing an oxide of an alkali element, Rb or Cs, is preferably used as the host glass.

It is still unclear that the above assumption is appropriate. In any case, according to the experiments and examinations of the present inventor, when an oxide-based multi-component glass containing Rb or Cs is used as the host glass doped with $Nd^{3+}$ as an active ion, a promising optical functioning glass which allows optical amplification of $Nd^{3+}$ at the 1.3-μm wavelength band or the like or improves its optical amplification efficiency can be obtained.

In this case, when a host glass having a large amount of an alkali element added thereto is used so as to obtain an effective shift in ESA peak wavelength, stability of the host glass is degraded. This phenomenon typically occurs when the content of the alkali element exceeds 45 mol%. In particular, when a long-periodic element such as Rb or Cs is used, deliquescence and the like become conspicuous to accelerate degradation. If the concentration of Rb or the like is reduced and the content of the oxide of Rb or the like is controlled to be 5 mol % or less in order to improve deliquescence, a typical shift does not occur in the ESA peak wavelength.

The present inventor searched for a host material exhibiting chemical stability even if the above long-periodic element is used. In order to improve chemical stability of the glass itself, an alkaline-earth element is preferably used as an additive. It is, however, undesirable, that the ESA peak wavelength tends to return to the original wavelength due to doping of the alkaline-earth element or that the fluorescence peak wavelength tends to be largely shifted to the long-wavelength side. For this reason, the silicate glass in FIG. 1 is used as a starting material, an alkaline-earth element such as Mg or Ca is added thereto or part of the starting material is substituted with Mg or Ca, thereby preparing an optical functioning glass. Tests such as a deliquesence test and weather resistance test of this glass sample were performed, and it was found that these chemical properties were improved, thereby greatly improving chemical stability. Note that the fluorescence peak and the ESA peak were not almost changed as compared with that in FIG. 1.

Figure 4:
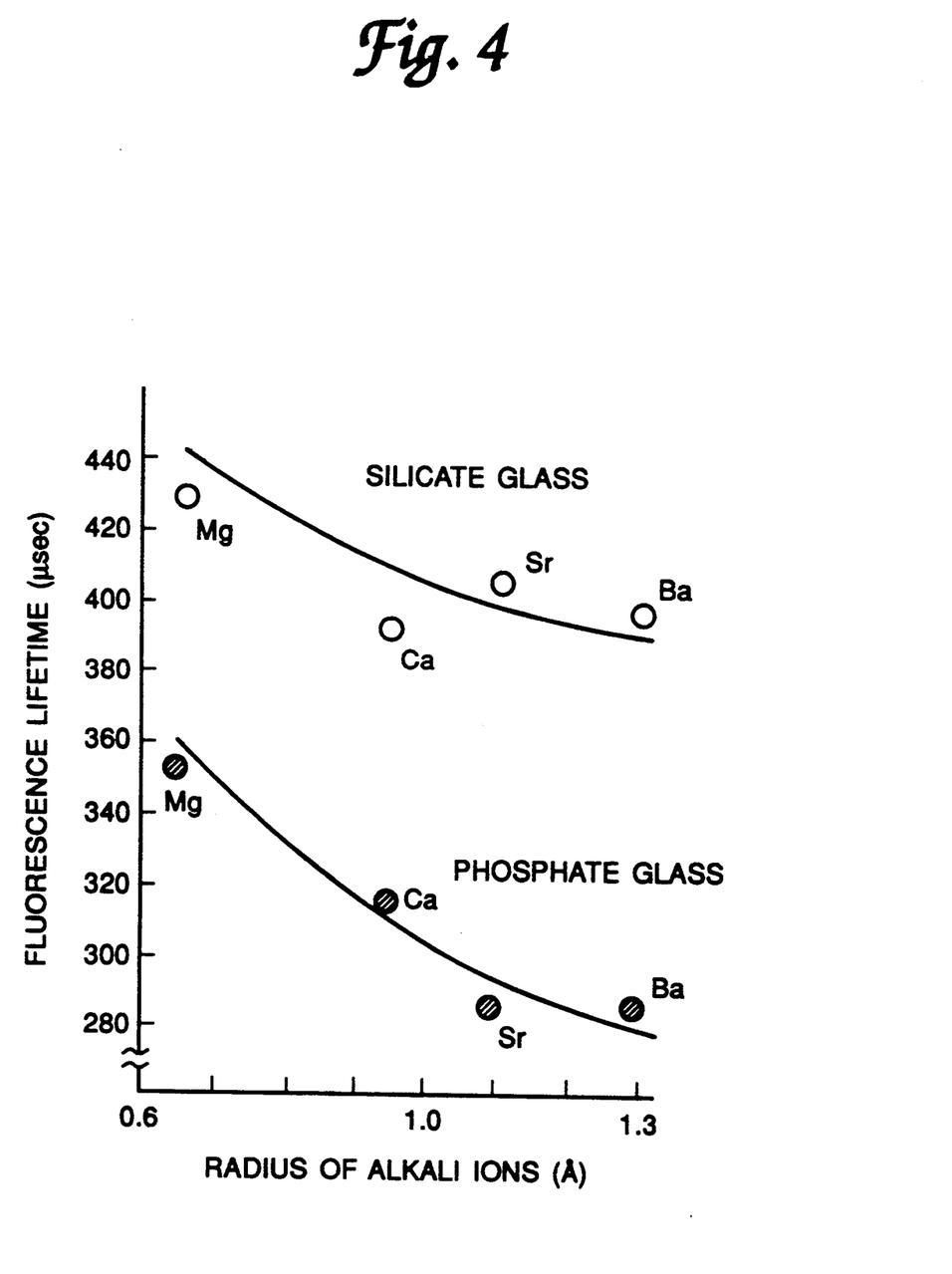
FIG. 4 is a graph showing a relationship between the types of alkaline-earth dopants and $Nd^{3+}$ fluorescence lifetimes.

FIG. 4 shows variations in $Nd^{3+}$ fluorescence lifetimes in accordance with the types of alkaline-earth elements used. It is found that the fluorescence lifetime is shortened when the radius of an ion is increased. It is therefore found that a preferable composition of the host glass to be doped with $Nd^{3+}$ contains Rb and/or Cs and also Mg.

The optical functioning glass shown in FIG. 1 to 4 is used as an optical fiber material. For example, this glass material is used to form a planar waveguide or the like. It is preferable to manufacture an optical fiber comprising a core made of the above optical functioning glass and a cladding surrounding the core and having a lower refractive index than that of the core, so as to obtain an elongated optical transmission line.

The above optical fiber is manufactured as follows in practice. An optical functioning glass obtained by doping $Nd^{3+}$ in a host glass containing Rb or Cs is prepared, and a preform having a core made of this optical functioning glass is formed in accordance with a rod-in-tube method. The prepared preform is set in a known drawing apparatus and is drawn into an optical fiber. The resultant optical fiber comprises a core doped with $Nd^{3+}$ and a cladding layer having a lower refractive index than that of the core and not doped with $Nd^{3+}$.

The optical fiber having the core made of the optical functioning glass described above can be applied to an optically active device such as a fiber laser, a fiber amplifier, and a fiber detector. More specifically, since the oxide-based multi-component glass containing an oxide of Rb or Cs is used as the host glass for the core glass, sufficiently high optical amplification and oscillation gains can be obtained in, e.g., the 1.3-μm wavelength band or the wavelength band near the 1.3-μm wavelength band. In addition, since light is efficiently confined in the core by fiber formation and its loss is extremely low, an inverted population can be formed with a small threshold value. Therefore, applications for a high-gain fiber amplifier or the like can be made.

In addition, the above optical fiber can be used in a fiber amplifier for amplifying light of the 1.3-μm wavelength band as an application example.

Figure 5:
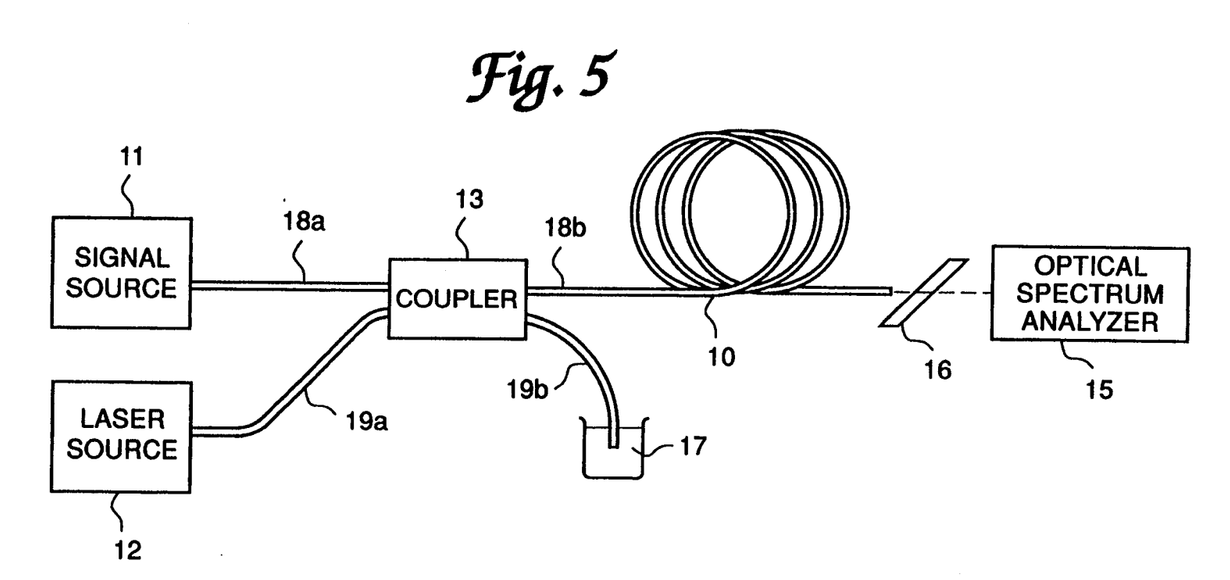
FIG. 5 is a diagram showing an embodiment of a fiber amplifier.

FIG. 5 shows a 1.3-μm wavelength band fiber amplifier. A laser diode is used as a signal source 11. One end of an optical fiber 18a is optically connected to the output of this signal source 11. The other end of the optical fiber 18a is connected to the input of a coupler 13. A Ti-sapphire laser is used as a laser source 12 as an excitation light source. One end of an optical fiber 19a is connected to the output of the laser source 12. The other end of the optical fiber 19a is connected to the input of the coupler 13.

Two optical fibers 18b and 19b extend from the output of the coupler 13. The terminal end of the optical fiber 19b is dipped in a matching oil 17 for preventing return light. The terminal end of the optical fiber 18b is connected to one end of an optical fiber 10 serving as an optical transmission line through a connector or the like. A spectrum analyzer 15 is arranged at the output as the other end of the optical fiber 10. A filter 16 is inserted in the optical fiber 10 and the spectru, analyzer 15.

The coupler 13 is obtained by fusing and then stretching the two optical fibers 18 and 19. The coupler 13 and the fibers 18a, 18b, 19a, and 19b constitute an optical means.

The optical fiber 10 comprises an SM fiber having a length of 1 m. The optical fiber 10 has an outer diameter of 125 μm and a core diameter of 5 μm. Note that a silicate glass containing an oxide of an alkali element such as Rb or Cs and doped with $Nd^{3+}$ as an active ion is used as the host glass.

An operation of the fiber amplifier in FIG. 5 will be briefly described below. The laser source 12 outputs excitation light at a 0.80-μm wavelength band. This excitation light is incident on the coupler 13 through the optical fiber 19a and on the optical fiber 10 through the optical fiber 18b. Since the core of the optical fiber 10 on which the excitation light is incident is doped with $Nd^{3+}$ as an active ion, the $Nd^{3+}$ excited in a predetermined state with this excitation light is set in a state wherein light at a 1.3-μm wavelength band can be emitted.

The signal light of the 1.3-μm wavelength band output from the signal source 11 is incident on the fiber coupler 13 through the optical fiber 18a. The signal light incident on the coupler 13 is coupled to the excitation light from the laser source 12 and is then incident on the optical fiber 10. The signal light incident on the optical fiber 10 stimulates the pumped $Nd^{3+}$ to emit light at the 1.3-μm wavelength band.

The excitation light and the amplified signal light are output from the output of the optical fiber 10. Of these light components, the excitation light is cut off by the filter 16. For this reason, only the amplified signal light is incident on the spectrum analyzer 15. Therefore, the optical amplification gain by the $Nd^{3+}$-doped optical fiber can be measured.

Table I below shows measurement results of the optical amplification gains of the fiber amplifier shown in FIG. 5.

TABLE I

|  | Amplification Peak [μm] | Gain at 1.31 μm |
| --- | --- | --- |
| Sample 1 | 1.327 | 20 dB |
| Sample 2 | 1.327 | 17 dB |
| Sample 3 | 1.320 | 10 dB |
| Sample 4 | 1.350 | 0 dB |

In this case, $K_2O$, $Rb_2O$, and $Cs_2O$ were used as the alkali element oxides $R'_2O$. Materials for the core glass of Samples 1 to 4 were blended to obtain the following compositions. These materials were respectively melted in platinum melting pots and were rapidly cooled to be vitrified.

| | |
| --- | --- |
| $20Na_2O\text{-}15Rb_2O\text{-}65SiO_2$ | (Sample 1) |
| $20Na_2O\text{-}15Cs_2O\text{-}65SiO_2$ | (Sample 2) |
| $20Na_2O\text{-}15K_2O\text{-}65SiO_2$ | (Sample 3) |
| $20Na_2O\text{-}15Li_2O\text{-}65SiO_2$ | (Sample 4). |

$Nd^{3+}$ serving as an active ion was prepared as an oxide in a material preparation step so as to obtain a concentration of 1 wt %.

As is apparent from Table I, in Samples 1 and 2 respectively using Rb and Cs as alkali elements, high gains are obtained. On the other hand, in Samples 3 and 4 respectively using K and Li as alkali elements, no gain is obtained or small gains are obtained if any.

Table II below shows fluorescence peaks and so on when a host glass having an alkali element oxide, $Rb_2O$, and Mg oxide added thereto is used.

TABLE II

|  | ESA Wavelength [μm] | Fluorescence Wavelength [μm] | Deliquescence (Visual Observation) |
| --- | --- | --- | --- |
| Sample 1 | 1.353 | 1.327 | None |
| Sample 2 | 1.344 | 1.327 | None |
| Sample 3 | 1.351 | 1.327 | None |
| Sample 4 | 1.346 | 1.327 | Slight |

In this case, the fluorescence peaks were measured using the fiber amplifier shown in FIG. 5. Materials for the core glass of Samples 5 to 8 were blended to obtain the following compositions and were respectively melted in platinum crucible and rapidly cooled to be vitrified.

| | |
| --- | --- |
| $20Na_2O\text{-}10Rb_2O\text{-}10MgO\text{-}60SiO_2$ | (Sample 5) |
| $15Na_2O\text{-}10Rb_2O\text{-}10MgO\text{-}65SiO_2$ | (Sample 6) |
| $10Na_2O\text{-}10Rb_2O\text{-}10MgO\text{-}70SiO_2$ | (Sample 7) |
| $10Na_2O\text{-}15Rb_2O\text{-}10MgO\text{-}65SiO_2$ | (Sample 8). |

Note that $Nd^{3+}$ serving as an active ion was prepared as an oxide in a material preparation step so as to obtain a concentration of 1 wt %.

As is apparent from Table II, in Samples 5 to 8 using Mg as the alkaline-earth element, the ESA peak wavelengths are 1.344 μm or more. The fluorescence peaks are kept at the wavelength of 1.327 μm. It is therefore assumed that high gains are obtained at and near the 1.32-μm wavelength band. In this case, deliquescence was not almost found in all the samples. These glass samples were excellent in weather resistance. For example, the glass used as the core glass of Sample 5 was cut into a test piece, and this test piece wasdipped in water at room temperature for 50 hrs or more. The weight of this test piece was not almost reduced.

In the fiber amplifier shown in FIG. 5, the signal light from the signal light source 11 and the excitation light from the laser source 12 are incident on the optical fiber 10. The signal light from the signal light source may be incident on one end of the optical fiber 10, and the excitation light from the laser source may be incident on the other end of the optical fiber 10. In addition, one or a plurality of laser sources for generating excitation light components having predetermined wavelengths capable of performing fluorescent emission of $Nd^{3+}$ may be prepared in accordance with signal light components having different wavelengths corresponding to the $Nd^{3+}$ fluorescent emission components. Signal light having each wavelength is incident on one end of the optical fiber 10, and at the same time, the excitation light from the laser source may be incident on the other end of the optical fiber to achieve a multi-channel fiber amplifier.

Figure 6:
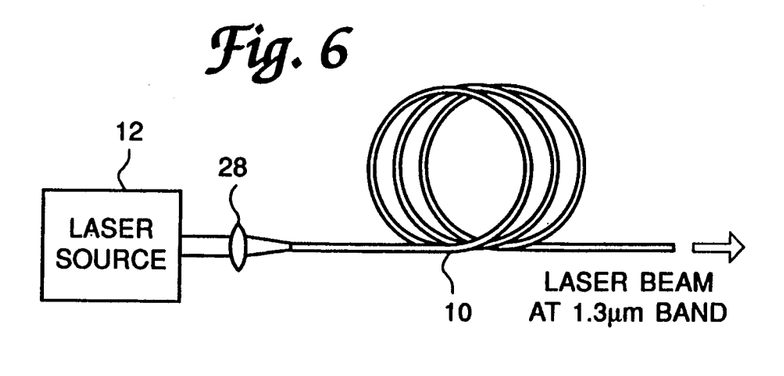
FIG. 6 is a diagram showing an embodiment of a fiber laser.

FIG. 6 shows an embodiment of a 1.3-μm wavelength band fiber laser. A laser light source 12 is identical to that used in the fiber amplifier shown in FIG. 5. That is, the laser source 12 is a 0.80-μm wavelength Ti-sapphire laser. An optical fiber 10 doped with $Nd^{3+}$ is also identical to that used in the optical amplifier.

The excitation light having a wavelength of 0.80 μm from the laser source 12 is incident on one end of the optical fiber 10 having the core doped with $Nd^{3+}$ by an appropriate means 28 such as a lens or an optical connector. The $Nd^{3+}$ contained in the optical fiber is excited to a predetermined state by this excitation light, and light at the 1.3-μm wavelength band can be emitted. Since the input and output ends of the optical fibers 10 are made mirror surfaces, these end faces of the input and output ends constitute a resonator. As a result, when an output of the excitation light exceeds a predetermined value, laser oscillation occurs at any wavelength within the 1.3-μm wavelength band.

Figure 7:
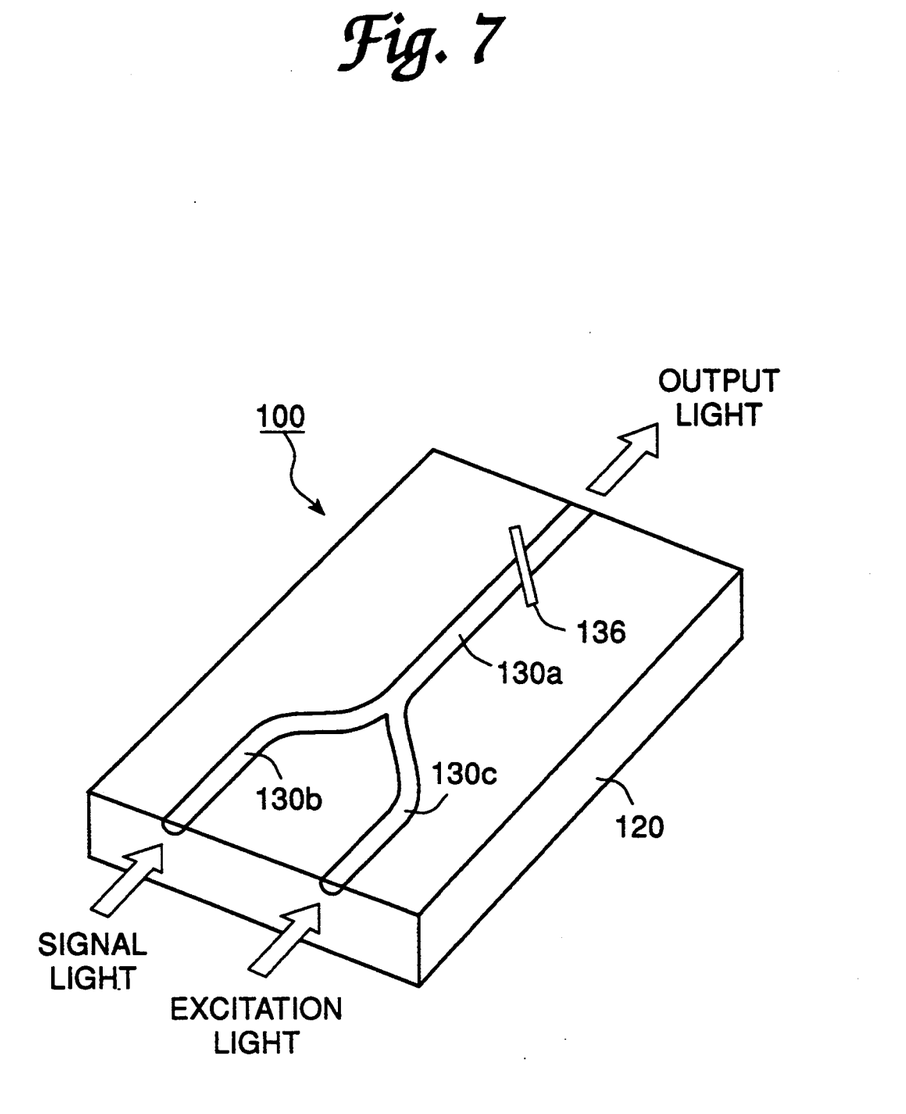
FIG. 7 is a perspective view showing an embodiment of a waveguide laser.

FIG. 7 shows an embodiment of a waveguide amplifier 100. Planar waveguides 130a, 130b, and 130c are formed on a substrate 120 so that one waveguide is branched into two waveguides. The planar waveguide 130a is made of the glass of the above embodiment doped with $Nd^{3+}$. A filter 136 made of a grating is formed at the other end of the planar waveguide 130a. Signal light at the 1.3-μm wavelength band is incident on the planar waveguide 130b. Excitation light at the 0.80-μm wavelength band is incident on the planar waveguide 130c. A laser source is identical to that shown in FIG. 5.

An operation of the waveguide amplifier 100 shown in FIG. 7 will be briefly described. The signal light at 1.3-μm wavelength band is incident on the planar waveguide 130a through the planar waveguide 130b. The excitation light at the 0.80-μm wavelength band from the excitation light source such as a semiconductor laser is also incident on the planar waveguide 130a. The excitation light excites the $Nd^{3+}$ serving as the active ion. The excited $Nd^{3+}$ is stimulated by the signal light, and radiation light at the 1.3-μm wavelength band is generated. When the excitation light exceeds a predetermined intensity, the signal light is amplified.

In those embodiments, the host glass used in the core of the optical fiber or the planar waveguide consists of a silicate multi-component glass. However, the composition of the host glass is not limited to this. For example, a phosphate glass and borate glass may be used or may be added in the above composition.

In addition, the resonator used in the fiber laser may be of a type using a dielectric mirror or the like.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical fiber comprising: a core made of an optical functioning glass, said optical functioning glass being an oxide-based optical functioning glass containing $Nd^{3+}$ as an active ion doped in a host glass, wherein the host glass contains at least one element from the group consisting of Rb and Cs.

2. An optically active device comprising:
    an optical fiber according to claim 1,
    a light source for generating excitation light at a 0.80-μm wavelength band or a band near the 0.80-μm wavelength band; and
    optical means for directing the excitation light from said light source to said optical fiber.

3. A fiber amplifier comprising:
    an optically active device according to claim 2; and
    coupling means for coupling signal light at a 1.3-μm wavelength band or a band near the 1.3-μm wavelength band into said optical fiber.

4. A fiber laser comprising:
    an optically active device according to claim 2; and
    resonator means for feeding light at a 1.3-μm wavelength band or a band near the 1.3-μm wavelength band from said optical fiber back to said optical fiber.

5. A waveguide device comprising a planar waveguide made of an optical functioning glass which is an oxide-based optical functioning glass containing $Nd^{3+}$ as an active ion doped in a host glass, wherein the host glass contains at least one element selected from the group consisting of Rb and Cs.

6. A device according to claim 5, wherein said device propagates light at a 1.3-μm wavelength band or a band near the 1.3-μm wavelength band.

7. An optically active device comprising:
    a waveguide device according to claim 5;
    a light source for generating excitation light for exciting $Nd^{3+}$; and
    optical means for directing the excitation light from said light source to said planar waveguide.

8. An optically active device comprising:
    a waveguide device according to claim 6;
    a light source for generating excitation light at a 0.80-μm wavelength band or a band near the 0.80-μm wavelength band; and
    optical means for directing the excitation light from said light source to said planar waveguide.

9. A waveguide amplifier comprising:
    an optically active device according to claim 8; and
    coupling means for coupling signal light at a 1.3-μm wavelength band or a band near the 1.3-μm wavelength band to said planar waveguide.

10. A waveguide laser comprising:

an optically active device according to claim 8; and resonator means for feeding light at a 1.3-μm wavelength band or a band near the 1.3-μm wavelength band from said planar waveguide back to said planar waveguide.

11. An oxide-based optical functioning glass containing $Nd^{3+}$ as an active ion doped in a host glass, wherein the host glass contains Rb of which amount is sufficient to cause a shift in the ESA peak wavelength in optical amplification and optical oscillation at the 1.3 μm wavelength band, when a light of 1.3 μm wavelength band and a light of 0.8 μm wavelength band enter thereinto at the same time.

12. An oxide-based functioning glass comprising:
a host glass containing Cs; and
$Nd^{3+}$, as an active ion, doped in said host glass,
wherein the amount of Cs contained in the host glass is sufficient to cause a shift in ESA peak wavelength in optical amplification and optical oscillation at the 1.3 μm wavelength band, when a light of 1.3 μm wavelength band and a light of 0.8 μm wavelength band enter thereinto at the same time.

13. An oxide-based functioning glass comprising:
a host glass containing Cs and Rb; and
$Nd^{3+}$, as an active ion, doped in said host glass,
wherein the amount of Cs and Rb contained in the host glass is sufficient to cause a shift in ESA peak wavelength in optical amplification and optical oscillation at the 1.3 μm wavelength band, when a light of 1.3 μm wavelength band and a light of 0.8 μm wavelength band enter thereinto at the same time.

14. An oxide-based functioning glass according to claim 12, wherein said host glass further contains an alkaline-earth element selected from the group consisting of Mg and Ca.

15. An optical waveguide, comprising:
an oxide-based optical functioning glass including a host glass containing Cs and Rb, and $Nd^{3+}$, as an active ion, doped in said host glass; and
a cladding material having a lower refractive index than that of the optical functioning glass, at least partially surrounding the optical functioning glass.

16. An optical waveguide according to claim 15 wherein the said waveguide propagates light at or near the 1.3 μm wavelength band.

17. An optically active device comprising:
a light source for generating excitation light;
an optical waveguide including an oxide-based optical functioning glass, said optical functioning glass including a host glass containing Cs and Rb, and $Nd^{3+}$, as an active ion, doped in said host glass, and
a cladding material, having a lower refractive index than that of the optical functioning glass, at least partially surrounding the optical functioning glass; and optical means for directing said excitation light from said light source to said optical waveguide for exciting said $Nd^{3+}$ ions.

18. An optically active device as in claim 17, wherein said light source generates excitation light at or near the 0.8 μm wavelength band.

19. An optical amplifier comprising:
an optical waveguide including an oxide-based optical
functioning glass, said optical functioning glass including a host glass containing Cs and Rb, and $Nd^{3+}$, as an active ion, doped in said host glass; and
a cladding material; wherein the cladding material has a lower refractive index than that of the optical functioning glass, at least partially surrounding the optical functioning glass;
a light source for generating excitation light at or near the 0.8 μm wavelength band;
optical means for directing the excitation light into the optical waveguide; and
coupling means for directing an input signal light into the optical waveguide, said input signal light being at or near the 1.3 μm wavelength band.

20. A laser comprising:
a light source for generating excitation light at or near the 0.8 μm wavelength band;
an optical waveguide including an
oxide-based optical functioning glass; wherein said optical functioning glass includes a host glass containing Cs and Rb, and further includes $Nd^{3+}$, as an active ion, doped in said host glass; and
a cladding material; wherein the cladding material has a lower refractive index than that of the optical functioning glass, at least partially surrounding the optical functioning glass;
optical means for directing the excitation light into the optical waveguide; and
resonator means for feeding light at or near the 1.3μm wavelength band emitted by said optical waveguide back into the optical waveguide.

21. A method of manufacturing an oxide-based optical functioning glass containing $Nd^{3+}$ as an active ion doped in a host glass, comprising the steps of:
preparing a host glass by melting selected oxides, said oxides including at least $SiO_2$, $Na_2O$, and $Cs_2O$ selected from the group consisting of $SiO_2$, $Na_2O$, $Cs_2O$, and $Rb_2O$; and
doping the resulting host glass with $Nd^{3+}$.

22. A method of manufacturing an oxide-based optical functioning glass according to claim 21, wherein the total concentration of the oxides $Rb_2O$ and $Cs_2O$ falls within a range from about 5 mol % to about 45 mol %.

* * * * *